Sept. 25, 1962        R. ARCHER        3,055,134
PLASTIC DECOY
Filed May 24, 1961
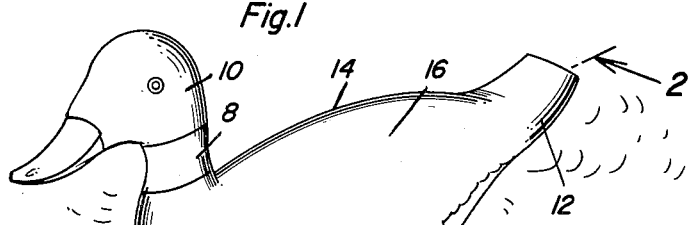
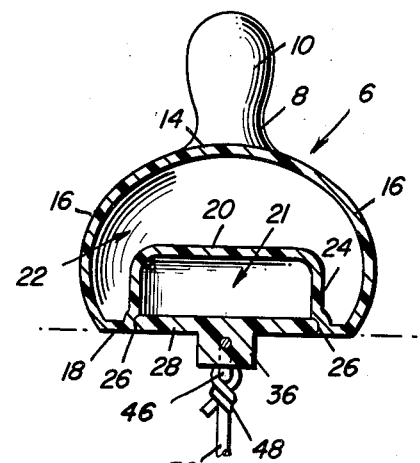
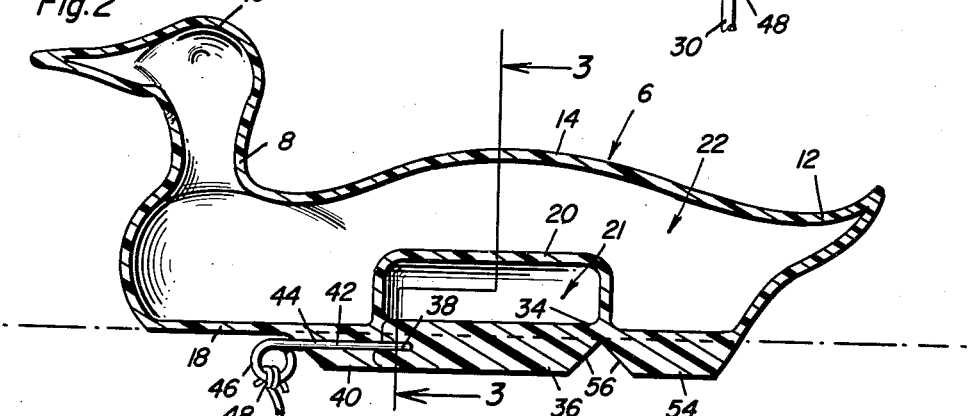
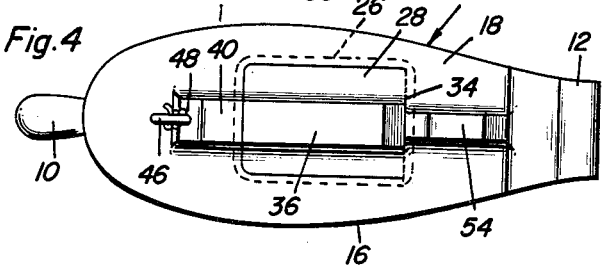
Red Archer
INVENTOR.
BY *Clarence A. O'Brien*
and *Harvey B. Jacobson*
Attorneys

United States Patent Office 3,055,134
Patented Sept. 25, 1962

3,055,134
PLASTIC DECOY
Red Archer, 112 W. Walnut St., Nevada, Mo.
Filed May 24, 1961, Ser. No. 112,319
5 Claims. (Cl. 43—3)

This invention relates to a decoy which features certain novel and useful improvements not found in prior art decoys.

An object of the invention is to provide a simple, practical and economical decoy which is made from neoprene plastic, is attractively colorful and shaped with requisite nicety to represent a duck, and which effectively tempts and lures the prey to the point of attack and within gunshot range of the hunter.

In carrying out the present invention no complicated reel and weighted line is used. Instead, a weight having an eye is provided and the lower end of the line is detachably tied to the eye. The upper end of the line is detachably connected to the bottom or ventral surface of the body in a novel manner to be hereinafter set forth.

The ventral side has a molded pocket with an open bottom, said pocket providing a compartment for storage of the weight and line when the latter are not being used. Therefore, a number of decoys can be transported and handled without encountering difficulties met when, as usual, several lines become perplexingly entangled.

The invention also features a highly simple flap which provides a closing door for the open side of the pocket. This feature is novel in that one end or marginal edge of the flap is joined by a web, the latter providing a unique hinge.

A further improvement resides in providing several ribs on the ventral side or bottom, one on the flap door with a keeper socket in one end, one at the rear thereof, and one in front and all in line with each other. The front rib carries a sliding latch pin projectible into the keeper socket, said pin having an eye to which the upper end of the line is tied.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of the improved decoy showing the manner in which it is used;

FIGURE 2 is a central longitudinal sectional view on an enlarged scale taken on the section line 2—2 of FIGURE 1;

FIGURE 3 is a section on the transverse or vertical irregular line 3—3 of FIGURE 2; and FIGURE 4 is a bottom plan view.

Although it is within the purview of the concept to employ a decoy body which is solid it is preferred that the body be constructed hollow and made from neoprene plastic. The overall decoy is denoted by the numeral 6. It comprises a main or body portion which is molded and shaped to imitate or represent a duck. The forward end is provided with a suitable neck 8 and head 10. The rearward portion is shaped to provide an appropriate tail portion 12. The main or body portion therebetween embodies a top or dorsal surface 14 which is convex, longitudinal side surfaces 16 suitably convexed as shown in FIGURE 3 and a generally flat or ventral portion or side 18. The median part of the ventral side is fashioned into and provides a rectangular or an equivalent pocket 20 which projects into the hollow portion 22 and has an open bottom which opens through the ventral side as shown. The junctional portions between the pocket walls 24 and ventral surface may be grooved as at 26 to accommodatingly receive the coacting marginal edge portions of the flap door 28. This door is obviously shaped to span and fit into the pocket opening whereby to provide a satisfactory closure. The space in the pocket provides a compartment in which the line 30 and weight 32 may be stored when not in use. As illustrated in FIGS. 2 and 3 the righthand end or edge portion of the flap or door is integrally joined to the cooperating portions by a flexibly resilient web 34 which provides a simple hinge. The underneath central portion of the flap or door is provided with a reinforcing longitudinally extending rib 36. This rib is commensurate in length with the length of the flap and the lefthand end portion thereof has a keeper socket 38 provided therein. A second shorter rib 40 is provided on the ventral side in line with the rib 36 and the two ribs have abutting association as illustrated in FIGURE 2. This rib 40, also a lug, has an axial bore 42 extending therethrough and which provides a passage for the latch pin 44. The pin is of a length that one end portion thereof projects into the keeper socket to effect the desired latchable door retaining result. The forwardly projecting end of the pin is provided with an eye 46 which functions as a finger-grip and which also permits the upper end 48 of the line 30 to be tied thereto. The lower end of the line is likewise tied, as at 50, to an eye 52 on the upper end of the weight or anchor 32. There is also a relatively short third rib provided at 54 and this is in line with the ribs 36 and 40 and is mounted on the central region of the ventral side or bottom 18. The adjacent ends of ribs 36 and 54 are beveled at at 56 to allow the flap door to be readily opened and closed.

In using the decoy the user simply determines the length of the line 30 desired according to the locale where the decoy is to be stationed. It has been found that it is not necessary to employ, as is true in certain prior art devices, complicated enclosed reels and the like. The desired length of line as selected and the upper end is tied as at 48 to the eye 46 and the lower end tied as at 50 to the eye 52. When the decoy is in use as illustrated in FIGURE 1 the storage compartment 21 is empty. When the line and weight are not being used the flap door 28 is unlatched and the line and weight are placed in the compartment 21 and the door is again closed and latched in its closed position. While it might be quite possible to store the line and weight in the hollow portion 22 of the body it has been found to be more desirable to utilize the restricted pocket or compartment and to confine the line and weight to this area where it is readily accessible.

The centered lengthwise rib 36 on the bottom of the flap door 28 stabilizes the door and also provides a practical place for the keeper socket 38 which is in line with rib 36 and supports the projectible and retractible latch pin 44. These two ribs 36 and 40 are of the same cross-section. The third rib 54 need not be of the same cross-section. This last-named rib is a stabilizer like the other two ribs and the several ribs together provide a keel and assist in properly positioning the decoy when it is being used.

It is believed that a careful consideration of the specification and claims in conjunction with the views of the drawings will enable the reader to obtain a clear and comprehensive understanding of the construction and features and advantages of the invention. Therefore, a more lengthy description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modification and equivalents may be resorted to, falling within the scope of the invention as claimed.

What is claimed as new is as follows:

1. A decoy comprising a hollow one-piece buoyant body embodying dorsal, ventral and side portions, said ventral side having a pocket projecting into the hollow portion of the body and opening through the ventral side and providing a compartment for storage of a weight and line not in use, a flap providing a closing door for the opening at the bottom of said compartment, said flap being hingedly joined at an end thereof to said ventral side, said flap having a keeper, and a latch pin slidingly mounted on the ventral side in line with the keeper and having an end portion projecting into said keeper.

2. The structure defined in claim 1, and wherein said body and flap are made of moldable plastic material and are united to provide a single entity.

3. A decoy comprising a hollow body made of moldable plastic material, shaped to imitate a duck and having a body portion, head and neck portion, tail portion, dorsal, ventral and side portions, said ventral portion being substantially flat and a median part thereof having a pocket projecting upwardly into the hollow portion of said body, opening downwardly through said ventral side and providing a compartment in which a weight and line may be stored when not being used, said ventral portion having a freely movable flexible flap with one end flexibly jointed to the ventral portion at one end of the pocket, said flap spanning the open side of the pocket and providing a closing door for the pocket, the bottom side of said flap having a reinforced rib one end of which is provided with a keeper socket, and a projectible and retractible latch pin slidingly mounted on said ventral portion and having an end projecting into said keeper socket.

4. A decoy comprising a hollow body made of moldable plastic material, shaped to imitate a duck and having a body portion, head and neck portion, tail portion, dorsal, ventral and side portions, said ventral portion being substantially flat and a median part thereof having a pocket projecting upwardly into the hollow portion of said body, opening downwardly through said ventral side and providing a compartment in which a weight and line may be stored when not being used, said ventral portion having a freely movable flexible flap with one end flexibly joined to the ventral portion at one end of the pocket, said flap spanning the open side of the pocket and providing a closing door for the pocket, the bottom side of said flap having a reinforcing rib one end of which is provided with a keeper socket, a second rib on the ventral portion in line with said first-mentioned rib and having an axial bore therethrough in line with said socket, a latch pin sliding mounted in said bore with one end projecting releasably into said socket, the other end of said pin having an eye providing a finger grip and a line attaching member, and a third rib also provided on said ventral portion rearwardly of and in alignment with said first-named rib.

5. A decoy comprising a body shaped to imitate a duck and having a ventral portion provided with a pocket extending into the body, said pocket having an open side opening downwardly through said ventral side and providing a compartment, a flap joined to the ventral portion by a flexible connection, spanning the open side of the pocket and providing a closing door, said flap having a bottom side provided with a rib one end of which is provided with a keeper socket, a second rib on the ventral portion in line with said first-named rib and having an axial bore extending therethrough and lined up with the socket, a latch pin slidingly mounted in said bore with one end projecting releasably into said socket, the other end of said pin having an eye, and a third rib also provided on said ventral portion rearwardly of and in alignment with said first-named rib and constituting a reinforcing member.

References Cited in the file of this patent

UNITED STATES PATENTS

| | | |
|---|---|---|
| 403,595 | Jencks | May 21, 1889 |
| 2,564,513 | Terwilliger | Aug. 14, 1951 |
| 2,842,890 | Goroni | July 15, 1958 |